United States Patent Office 2,712,698
Patented July 12, 1955

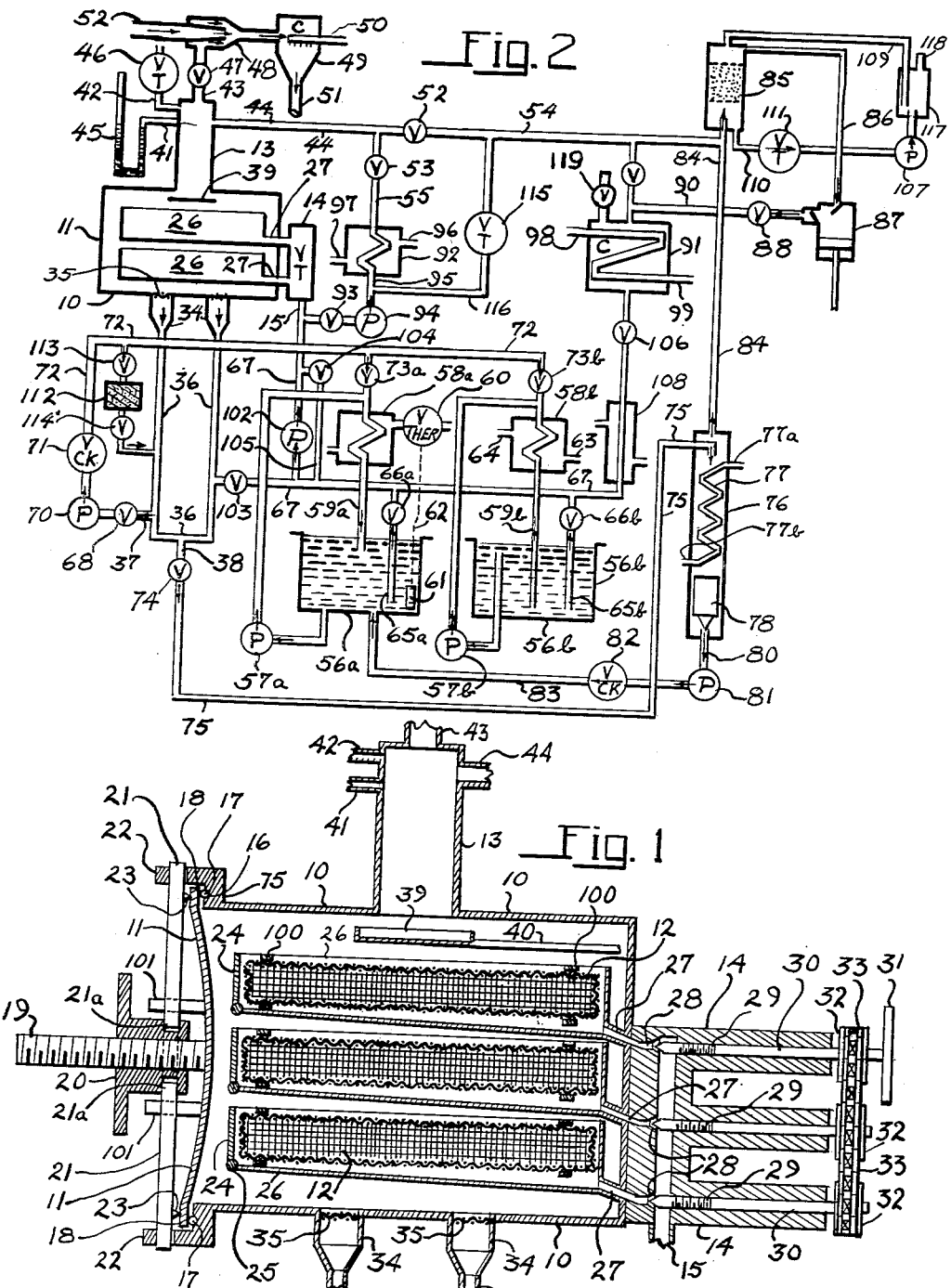

2,712,698

REMOVAL OF DEHYDRATING LIQUID FROM FOODS

Wells Alan Webb, Salinas, Calif.

Application January 15, 1951, Serial No. 206,043

1 Claim. (Cl. 34—9)

The present invention relates to the art of rapidly dehydrating solid food objects such as seeds, fruits, vegetables, meats, cereal products and the like. The invention relates more particularly to the use of solvents of relatively high vapor-pressure for the extraction of heat-conducting liquids of relatively low vapor-pressure from solid food objects that have been dehydrated in the said heat-conducting liquid.

The cost of processing delicate solid food objects in drying operations such as roasting, frying, desiccating, dehydrating, parching and baking depends, in the main, upon the ease and rapidity with which large quantities of the materials can be heated. The heat must be applied uniformly, at the optimum temperature and in amount sufficient for the purpose. For the highest rates of drying a heat-conducting fluid is used to contact the material that is to be treated. The fluid is first made to obtain heat from the primary heat source; and second, it is made to circulate among the objects that are to be dried, and to give up heat by direct contact with all surfaces of those objects. The surface area of the objects in contact with heating means is thereby greatly increased and rate of drying is very substantially speeded up. Liquids have much higher volumetric specific heats than gases and are far more effective as heating fluids. For example, use of heated fats for dehydrating foods at atmospheric pressure is customary in French frying, potato chip making, the cooking of doughnuts, fritters, crullers and the like.

In my United States Patent 2,473,184, I teach the circulation of heated oil among whole fruits and fruit particles at an absolute pressure of less than one-half pound per square inch. I show that heat units may be brought rapidly to all fruit particles to generate an exceptionally high rate of evaporation of moisture without destructively raising the temperature of the fruit. Hutteman, in United States Patent 1,929,691 teaches the drying of comminuted copra by heated oil at an absolute pressure of about five pounds per square inch.

Products that result after processing in a heated liquid must necessarily emerge from the treatment more or less steeped in the liquid, and the method as formerly used, must therefore be limited to the production of such products as can be advantageously associated with the treating liquid. Materials or products that show up disadvantageously in association with the treating liquid cannot, therefore, be so treated unless the process is improved by addition of a method for removing excess treating liquid.

In my aforementioned patent I teach the control, within limits, of absorption of treating liquid by the material being treated. Thus, where absorption of much liquid is desirable, I recommend maintenance of a level of edible liquid over the submerged material after the completion of vacuum dehydration, puffing and cooling steps, in order that, when the vacuum is finally broken, application of atmospheric pressure will drive some of the treating liquid deeply into pores of the material under treatment. Thus crisp puffed fruits containing from 50% to 60% of fat are obtained. On the other hand, for a lesser degree of impregnation, I teach in my above-mentioned patent, the draining away of the treating liquid before application of atmospheric pressure; and thereby I obtain crisp, puffed fruits containing only 15% to 25% of fat.

Now, there are applications and uses for food products that have been dehydrated in fat in which it is advantageous to set the fat content below 10% to as low as 2% or even lower. For example, when the processing fat is more costly than the anhydrous solids of the fruit being processed, a substantial saving can be realized by the manufacturer if he recovers all possible fat from his crisp fruit before selling the fruit. Thereby a product similar to the unimpregnated desiccated fruit is quickly and economically manufactured. Such crisp fruit products of very low moisture and low fat content are most useful for the making of sauces and stewed fruits where a higher quantity of fat would be objectionable were it present. Again, in the dehydration of vegetables it is often advantageous, and for the same reasons, to remove as much added fat as possible. In the processing of certain cereal products including spaghetti, noodles and the like, the use of an edible liquid heat-conducting medium such as a fat accelerates the drying stage; and the removal of the fat with a solvent selected in accordance with my method results in the production of dried cereal product of high quality. Also, in drying flesh products in a fat such as might be derived from the flesh, the fat is conserved and dried flesh product of low fat content is obtained by treating the flesh, after drying, with a solvent in the manner taught by the present invention.

In accordance with the present invention, and as one of the objects thereof, I have now developed a process whereby delicate solid food objects are rapidly dehydrated in a liquid of low vapor-pressure and the said liquid is then removed by extraction by an extracting liquid of relatively high vapor-pressure, whereupon the said extracting liquid is removed from the food by application of heat followed by reduction in pressure.

Another object of the present invention is to provide convenient means for separating the liquid of low-vapor-pressure from the extracting liquid.

Another object of the present invention is to provide convenient means for purifying and conserving the extracting liquid.

Still another object of the present invention is to provide apparatus suitable for conveniently carrying out my process for treating delicate solid food objects.

The invention possesses other objects and features of advantage which with the foregoing, will be set forth in the following description of the preferred form of the invention which is illustrated in the diagram and drawing accompanying and forming part of the specification.

It is to be understood, however, that I do not limit myself to said description, as I may adopt variations from said forms within the scope of the invention as set forth in the claim.

Materials treated by the process of the present invention are preferably delicate organic solids such as foodstuffs, especially fruits, including slices of apples, pears, peaches, apricots, nectarines, bananas, and also whole fruits such as grapes, raisins, prunes, apricots, peaches; in addition, vegetables, including whole and sliced onions, carrots, tomatoes, celery, bell peppers, parsley, spinach may be treated; also certain kinds of cereal products including cookies, biscuits, noodles, macaroni requiring heat-treatment and dehydration are advantageously treated by my new process; flesh products such as viscera and chopped fish may be treated. In short, any fruit, vegetable, cereal or meat product that might be profitably cooked or dehydrated in a liquid fat, but when so treated acquires certain disadvantages on account of being steeped with fat, can now be treated by my new process whereby dehydration in contact with a liquid fat is followed by extraction of the fat with a solvent of relatively high vapor pressure and removal of the solvent by drainage and evaporation.

In the extraction of fats from foods that have been processed by fat, certain requirements of the pure food laws, safety, economy and other considerations such as flavor impose severe limitations upon choice of a suitable liquid solvent. In addition to being a good solvent for fat, the liquid must be non-reactive with the food and the fat, and to the extent that it remains as a residue in the food, the extracting liquid must be non-toxic. It is to be preferred that the vapors from the extracting liquid be non-inflammable. In the alternative, should a combustible solvent be used, every necessary safety precaution must be taken to guard against accident. The extracting liquid or solvent should, in addition, be sufficiently stable to be recovered and reused repeatedly.

In my experiments I have discovered two factors of prime importance in removal of solvent after extraction, and these factors influence my choice of a preferred solvent. The first of these factors is the volatility of the solvent and the second is the effect of residual fat in retaining solvent in the food after extraction. I have found that, while it is possible to extract fat from foods by means of a relatively less volatile solvent such as hexane, carbon tetrachloride and the like, the removal of the last trace of the solvent after completion of extraction with such a solvent is exceedingly difficult. The result is the production of foodstuffs smelling and tasting of the solvent. I have found that the relatively non-volatile solvent remains dissolved in any trace of fat remaining in pores of the food after extraction and evaporates therefrom very slowly. On the other hand, when I use a more volatile solvent selected in accordance with the present invention and extract the fat more completely by following an extraction and solvent purging procedure such as is about to be described as forming a part of the present invention, I not only recover more of the solvent for re-use, but I also produce a superior product having no objectionable trace of solvent residue.

In treating fruits containing a high sugar concentration I prefer to eliminate the moisture at a low absolute pressure of from one to one fourth pound per square inch by submerging the fruit in vegetable oil at 150° F. to 250° F. until it is substantially dry, which requires from one hour or less time, to two hours or longer, depending upon whether whole fruits or relatively thin slices are being treated. Then I cool the puffed desiccated fruit to about 100° F. by admitting cool oil to the processing chamber. I then drain off the cooling oil and admit a volatile, non-toxic, inert oil solvent liquid such as dichloro-difluoromethane whereupon the pressure in the processing chamber rises to a superatmospheric value of approximately the vapor pressure of the solvent liquid at the temperature at which it exists within the processing chamber. The solvent fills receptacles containing the fruit under treatment, completely covers the fruit particles, enters pores of the fruit, and dissolves liquid fat and oil clinging to the fruit surfaces and pores. Thereupon I drain the liquid solvent away from the fruit. To aid volatilization of liquid solvent from the fruit, I may now pass heated solvent vapor among the fruit particles until the temperature of the fruit has been substantially raised; I then reduce the pressure and recover solvent vapor.

To avoid losses of salvageable materials, I collect all solvent vapor and solvent liquid containing dissolved oil, and separate the two components of the liquid by distillation, afterward condensing all the vapors and storing them for reuse. Oil obtained from the solvent is returned to oil storage tanks and reused. The extraction step may be repeated as many times as is necessary to reduce the fat content of the processed fruit to whatever value is desired.

In dehydrating cereals and vegetables, I follow substantially the same procedure in the use of processing fat except that I may employ a higher absolute pressure of four or more pounds per square inch during the dehydration stage. After dehydration is complete, the processing fat is removed from the produce as described in the example cited for fruit.

Meat products are usually dehydrated at nearly atmospheric and sometimes slightly superatmospheric pressures, and the excess fat is then removed by extraction as described in the example given for fruits.

Where a puffed product results after dehydration, and it is desired to retain the puffed structure, the material is cooled by admission of cool fat to contact the product after heat-treatment is completed; the oil is then drained away; and a volatile solvent is admitted to leach out the fat from the surfaces and pores of the solid product. The solvent is then drained. The volatile solvent liquid remaining in pores of the material is then removed by vaporization, heat for the vaporization of the solvent being supplied by circulation of superheated solvent vapor through the mass of material being treated. At the conclusion, I prefer to thoroughly exhaust the product by reducing the absolute pressure to a low value, thus purging substantially all of the solvent from the product by causing its evaporation. Heat for evaporation of traces of solvent remaining in the product in this last stage of the treating process is supplied by the cooling of the product. By condensing solvent vapor that has been collected and discharged by the pump used to exhaust the process chamber in this last stage of treatment, I conserve the solvent for reuse. Where a more complete extraction of fat is desired than can be attained by one treatment, the extraction process, as above described, is repeated that number of times necessary to produce the desired result.

As the extracting liquid, I prefer to use a fat solvent of relatively low boiling point and high volatility having boiling point lying within the approximate range of 45° C. to −80° C., and preferably within the range 35° C. to −30° C. I prefer a liquid that is sufficiently volatile to make it easily separated from the fat by distillation, yet not so volatile that an excessive pressure is required to liquefy it. For example, stable hydrocarbons having boiling points within the stated range may be used; among such hydrocarbons are: propane, butane, pentane, propylene, butylene, pentenes. Certain organic compounds containing oxygen are suitable solvents; among them are diethyl ether, methyl-ethyl ether and dimethyl ether. Many members of the group of halogen substituted hydrocarbons are suitable solvents; among the preferred solvents are: dichlorodifluoromethane, dichlorotetrafluoroethane, monochlorodifluoromethane, trichloromonofluoromethane, and dichloromonofluoromethane. Other typical refrigerants, for example, ammonia and carbon-dioxide can be used.

It is understood that the above list of solvents is not all-inclusive and is presented as a partial list by way of example, some desirable solvents not being included on the list, and certain solvents on the list being more desirable for use than others. In general, I prefer a fat solvent that is odorless, non-toxic, noninflammable, sufficiently volatile to be easily separated from fat, yet not possessing such extremely high vapor pressure at the temperatures at which the liquid solvent will be used so as to necessitate unusual nor unduly expensive construction in the apparatus to contain the liquid.

With reference to the illustrations:

Figure 1 is a cross sectional view of the processing chamber showing a preferred arrangement of receptacles within the chamber supporting material during treatment.

Figure 2 is a diagrammatic representation in which the various elements of the apparatus and the connections between them are shown by means of conventional symbols.

With reference to Figure 1, the processing chamber comprises a shell 10 on which is mounted a door 11 adapted to seal the chamber, cages 12 inside the chamber for containing the material to be processed, receptacles 26 for containing the cages 12, dome 13 through which exhaust vapors are withdrawn, distributing valve 14 for control of processing liquid being admitted to the several receptacles, and drains 34—34 for withdrawing liquid from the chamber.

The door for the processing chamber may be of any suitable construction adapted for sealing the chamber for both vacuum and pressure operation. For convenience of operation it is preferred that the door be adapted for quick opening and closing upon hinges, and that a quick-locking mechanism be used, such mechanisms being well-known in the art. For example, ring 75 welded to chamber 10 contains recess 16 into which a rubber gasket 17 is inserted that provides a seal against flange 18 of door 11; from the center of the door a threaded boss 19 projects and carries nut 20 that, when screwed toward the right, depresses levers 21—21; fulcrum bars 22—22, securely attached to rim 75, provide leverage points whereby rightward motion of ends 21a—21a of levers 21—21 force projections 23—23 of levers 21—21 against flange 18 of door and so tightly seal door 11. Studs 101—101 project from door 11 to hold bars 21—21 in alignment while nut 20 is being rotated.

Each receptacle 26 is provided with a gate 24 hinged at 25 so that when door 11 is opened and the gate is swung downward upon its hinge free access is had to the interior of the receptacle. Inside each receptacle 26 a screenwork cage 12 is placed for containing the material to be treated. These cages 12—12 may be slid out of receptacles 26—26 for unloading and loading. Bars 100—100 extending across the tops of cages 12—12 prevent the cages from rising under buoyancy of puffed fruit when receptacles 26—26 are filled with liquid. Each receptacle 26 has a connection 27 at its lower right-hand end that leads to distributing valve 14 and is adapted to convey fluids between the receptacle and the valve. Distributing valve 14 carries openings 28—28 communicating with corresponding receptacles 26—26 through connecting tubes 27—27. Openings 28 are of variable cross sectional area, controlled by adjustment of needles 29. Needles 29—29, turning on threads 30—30 are caused to move in or out simultaneously by rotation of wheel 31 which acts on all needles through sprockets 32—32 and chain 33. Thus the areas of the communicating passages 28—28 through which fluid passes in traversing from port 15 to receptacles 26—26 are equal and can be simultaneously and equally varied by adjustment of hand-wheel 31. Drain ports 34—34 protected by screens 35—35 are provided in the bottom side of the processing vessel for facilitating the drainage of liquids out of the processing chamber and down U pipe 36. A dome 13 is provided for collecting vapors arising from the receptacles. The dome separates out spray particles which fall into baffle 39 and are drained away through pipe 40. Vapors that pass up the dome communicate with pipes 41, 42, 43, and 44 whose functions will be explained in subsequent paragraphs that have reference to Figure 2.

Chamber 10 is connected to secondary pieces of apparatus in the manner now to be described with reference to Figure 2, wherein the various pieces of apparatus and their arrangement with respect to one another are shown symbolically. Outlets in vapor dome 13 are connected as follows: pipe 41 leads to a suitable gage for registering absolute pressure such, for example, as the manometer 45 wherein a glass U tube containing mercury has two arms, one of which is connected to the processing chamber, and the other contains a Torricelli vacuum. Such a gage, with arms of appropriate length, is capable of indicating any absolute pressure existing in vessel 10, the indication being registered in terms of difference in level of mercury in the respective arms of the gage, one inch of such difference in level being indicative of an absolute pressure of 0.49 pound per square inch. Any other suitable pressure gage may be used in place of the manometer. Pipe 42 leads to throttle valve 46 which, in turn, connects with the outside atmosphere and is capable of admitting air to or bleeding vapors from the processing chamber at a controlled rate. Pipe 43 leads, through valve 47, to vacuum booster ejector 48. The booster ejector utilizes motive steam from pipe 52 to compress the air and water vapor that it receives from chamber 10 and discharge the compressed vapor into jet condenser 49. The condenser utilizes cold water from pipe 50 to condense vapors and entrain non-condensible gases, forcing down barometric leg 51. If desired, additional ejector or pump means may be used to remove non-condensible gases from condenser 49. Pipe 44 is connected to vapor lines 54 and 55 through valves 52 and 53 respectively. The functions of these lines will be explained in a later paragraph.

Processing liquids used as heating and cooling mediums are contained in two tanks, a hot tank 56a and a cold tank 56b respectively. Hot tank 56a is provided with a pump 57a that receives liquid from the bottom of the tank and delivers it to heater 58a from which heated liquid is discharged back into the tank through pipe 59a. A thermostatic valve 60 controlled by thermosensitive element 61 in the liquid of tank 56a, and connecting cable 62 cooperate to regulate the admission of steam or other source of heat into heater 58a. Through action of the described liquid circulating system and thermostat valve 60, the temperature of liquid in tank 56a is maintained at a nearly constant predetermined value. Similarly, cold liquid tank 56b is provided with a circulating pump 57b that discharges liquid from tank 56b into a heat-exchange 58b; the latter returns cooled liquid to the tank through pipe 59b. In operation, cooling water is passed through pipe 63 and out pipe 64 of heat exchanger 58b so that the useful effect of the heat exchanger is to cool the stream of liquid flowing through the heat exchanger and thereby maintain the liquid in tank 56b at a constant low temperature. Hot oil tank 56a is connected with distributing valve 14 by means of suction pipe 65a, valve 66a, conduit 67, and pipe 15. Cold oil tank 56b is similarly connected by suction pipe 65b, valve 66b and conduit 67. The same tanks are connected with the drainage liquids of chamber 10 through U pipe 36, pipe 37, valve 68, pump 70, check valve 71, conduit 72, valves 73a, 73b and heat exchangers 58a and 58b respectively.

By an additional system of connections, liquid solvent is brought from U pipe 36 through connection 38, valve 74, conduit 75 into still 76. Still 76 possesses heating coil 77 that vaporizes certain materials entering the still, and float valve 78 at the bottom of the still is adapted to permit only liquid to escape from the still by pipe 80 and to close at low liquid level and prevent the escape of vapors. The bottom of the still is connected with tank 56a through valve 78, and pipe connection 80, pump 81, check valve 82 and conduit 83.

Vapors are brought to vapor compressor 87 from processing chamber 10 and from still 76 through a common vapor scrubber 85. The top of still 76 is connected to the suction side of vapor compressor 87 by means of vapor line 84 scrubber 85, and vapor line 86. Likewise dome 13 of the processing chamber is connected to compressor 87 through pipe 44, valve 52, vapor line 54, scrubber 85 and vapor line 86. Vapors compressed by compressor 87 are returned to the liquid state by passing through valve 88, through pipe 90, into condenser 91. Condenser 91 is cooled by water entering pipe 99 and leaving at 98.

Vapor warmer 92 is connected on its lower side to distributing valve 14 by pipe 15, valve 93, vapor circulating pump 94 and pipe 95, and on its higher side to dome 13 by pipe 44, valve 53 and pipe 55. Vapor warmer 92 is supplied with heating fluid such as steam that enters at 96 and leaves at 97.

Objects to be treated are placed in screen cages 12. The cages are slid through the open door of chamber 10 into receptacles 26 and gates 24 are then raised and locked, making the receptacles 26 capable of containing liquid. Door 11 is now closed and sealed. To start vacuum dehydration, valve 46 is closed, valve 47 is opened, steam is admitted by way of jet 52 into vacuum booster 48, water is admitted to jet condenser 49 from spray pipe 50 and vapors are thus entrained down barometric leg 51, forcing the evacuation of processing chamber 10. Regulation of valve 47 keeps the chamber pressure at any desired subatmospheric level. On the other hand, if atmospheric pressure operation is desired, operation of the vacuum system is not started; instead, valve 46 is opened wide in preparation for the free venting of and steam and vapors from chamber 10 to the atmosphere. If superatmospheric pressure is desired during dehydration, valve 47 is closed and throttle valve 46 is partially closed and adjusted in preparation for the building up of the desired vapor-pressure inside chamber 10 by evaporation of moisture from materials being heated therein. With the valves that control vapor-pressure within chamber 10 adjusted to the desired settings, heated liquid of low vapor pressure is admitted from tank 56a by starting pump 102, opening distributing valve 14 to the position for admission of liquids into receptacle 26, opening valve 66a, and closing valves 103, 93, 66b, 106, and 104. The closing of the latter valves is to prevent the liquid from straying, and to force the liquid to go where it is desired. In case of vacuum operation during the drying and cooling cycle, pump 102 may be removed from line 67 or by-passed by opening valve 104, as liquid will flow without pumping from tanks 56a–56b at atmospheric pressure into chamber 10 at subatmospheric pressure. But when chamber 10 is operated at a high pressure that prevents free entrance of liquid pump 102 must be operated and by-pass valve 104 must be closed. Liquid from distributing valve 14 enters receptacles 26 by way of conduits 27 and over-flows the receptacles, falling through screens 35 into collectors 34 and down U pipe 36 to pipe 37 where it flows through valve 68 into pump 70. Pump 70 moves the liquid through check valve 71, conduit 72, valve 73a, heater 58a, conduit 59a and into tank 56a from whence it came. During the circulation of liquid from tank 56a through chamber 10 and return, pump 57a had been working to circulate a by-pass stream of liquid through heater 58a. Heater 58a supplied with steam or other heating means through thermostatic valve 60 regulated by thermostat 61 in tank 56a, maintains the liquid in tank 56a at a constant temperature by supplying heat units equal in amount to those absorbed by liquid circulating through chamber 10. If a higher temperature is desired during any portion of the drying cycle than is employed during the remainder, thermostatic valve 60 can be adjusted at the time required to admit more steam to the heater and raise the temperature of liquid in tank 56a. When a lower temperature is needed, at the end of the drying operation, valve 66a is closed and valve 66b is opened to admit cool liquid from tank 56b into receptacles 26. When the cool liquid has returned through the circuit and has reached conduit 72, valve 73a is closed and valve 73b is opened, thus conducting the returned liquid into cooler 58b, pipe 59b and tank 56b. Circulation of the cool liquid is continued until the desired reduced temperature has been reached by the objects under treatment in receptacles 26, which may require from 3 to 10 minutes, depending upon rate of circulation, temperature of the cooling liquid and related factors. When the objects have been cooled, the coling liquid fat is allowed to drain by reverse flow out of receptacles 26. This is accomplished after stopping pump 102 by cutting off the supply of cooling liquid by closing valve 66b, then opening by-pass valve 104 and opening valve 103 to permit liquid fat to drain by reverse flow from receptacles 26 through channels 27 and orifices 28, past needles 29, down pipe 15, through valve 104, down by-pass 105 to pipe 67 and through valve 103 into pipe 36 from whence it is pumped by pump 70 into tank 56b. Reverse flow of the liquid under gravity propulsion out of receptacles 26 is facilitated by opening needles 19—19 wide to enlarge orifices 28—28. After reverse flow is completed and receptacles 26 are empty, the needles 19—19 are closed partially to prepare for forward flow of extracting liquid solvent from conduit 15 into receptacles 12. The needles 19 are closed sufficiently to cause an appreciable back-pressure to build up in conduit 15 and thereby facilitate substantially equal rates of discharge past orifices 28 despite appreciable differences in height of the respective orifices. In this way all of the receptacles 26—26 are ready to receive substantially equal rates of flow of extracting liquid from conduit 15.

After the dehydrated objects have been made cool and rigid and the cooling oil has been drained in the above described manner, a portion of the liquid solvent from condenser 91 is admitted to contact the material in receptacles 26—26. Valves 46 and 47 are closed to make the processing chamber tight and capable of holding pressure. Valves 106 and 14 are then opened sufficiently and pump 102 is operated to permit optimum rate of flow of solvent into the receptacles through line 67; valves 66a, 66b, 68, 103, 104 and 93 are closed for the operation. During its flow, the liquid solvent may be heated to any desired temperature by regulating admission of steam to heater 108. Liquid solvent overflowing receptacles 26 is laden with fat that it has extracted from the material in cages 12—12. The liquid solvent passes through collectors 34—34, down pipe 36, through valve 74, which has been opened, and via pipe 75 it flows into still 76 where it is evaporated by contact with heated coil 77 which is supplied with steam at 77a and drained of condensed water at 77b. Solvent vapor rises from coil 77, and passes through pipe 84 into the bottom of scrubber 85. The vapor passes up scrubber 85 counter-currently to a descending stream of wash liquid agent such as anhydrous potassium metaborate dissolved in methanol; then the vapor enters suction pipe 86 and compressor 87 which raises the pressure of the vapor and discharges the compressed vapor through valve 88, pipe 90 and into condenser 91. Cold water entering the condenser coil at 99 and discharging at 98 keeps the condenser coil cool and thus causes liquefaction of compressed vapors that enter the condenser. The oil or fat that remains behind after the solvent has evaporated drains to the bottom of stripping still 76 to be returned via pipe 80, pump 81, check valve 82, and pipe 83 into hot oil storage tank 56a. Solvent lost through leaks or otherwise is replaced through valve 119.

In the operation of scrubber column 85, the wash liquid is injected under pressure into pipe 109 from whence it passes into the top of the column, then down the column counter-currently to the rising solvent vapor, then the wash liquid collects at the bottom of the column in pipe 110 and is discharged from the column through throttle valve 111, which is regulated to permit only the wash liquid and no solvent vapor to pass. If desired, the wash liquid may now be pumped to the top of the column and used over again. Wash liquid is pumped by pump 107; it is stored in tank 117 and replenished thru pipe 118.

I have discovered that in the continuous operation of the dehydrating system on certain foods, for example apples, finely divided particles of the fruit accumulate in the liquid fat being used for dehydration. Presence of such particles tends to accelerate the development of rancidity in the fat; hence I prefer to remove the particles. To do this, I employ a filter which may be a continuous machine such as the well-known Oliver pre-coat filter or a batch device, for example the well-known Sweetland filter. In Fig. 2, I show a pressure filter 112 connected in a by pass line taking liquid through valve 113 from conduit 72, filtering the liquid and delivering it through valve 114 into pipe 36; by operating such filtering means, the concentration of small foreign bodies in the liquid fat is kept below the point at which the particles might cause rancidity.

I now cite typical examples in which my process is advantageously employed:

*Example 1.*—Fresh Newtown Pippin apples grown in the region of Watsonville, California, were peeled, cored and sliced to approximately one sixteenth inch thickness. The slices were placed to a depth of about six inches in cages 12, the cages were slid into receptacles 26, chamber 10 was sealed and a vacuum was drawn rapidly until the absolute pressure inside the chamber was about eight inches of mercury. Then heated coconut oil at about 190° F. to 210° F. was circulated among the apple slices; meanwhile the absolute pressure was being gradually reduced until between forty and fifty minutes had elapsed, then the absolute pressure had reached three eighths to three sixteenths of an inch of mercury and the apple slices had become substantially dry, containing only about one to one half of one per cent of moisture. Then cool fat was passed among the apple slices until their temperature had reached approximately 120° F. to 100° F. and they had become sufficiently rigid to withstand increase in pressure without collapsing. Then the cool fat was drained off the apple slices. The slices when drained, at this time contained in their pores, approximately 40% to 50% of fat. Then I adjusted the proper valves for pressure in chamber 10 and I admitted dichlorodifluoromethane fat solvent into receptacles 26 until the fruit in cages 12 was covered with the liquified solvent. Then I drained the solvent out of receptacles 26. Then I circulated heated dichlorodifluoromethane vapor from storage tank and condenser 91 down through the fruit in cages 12—12, admitting the vapor to chamber 10 through pipe 44 and removing it from receptacles 26—26 through channels 27—27. The vapor was circulated through the fruit and through heater 92 by operation of pump 94. While the heated vapor was thus circulating and maintaining the fruit at an elevated temperature of 140° F. to 180° F., I operated pump 87 and adjusted valve 115 to gradually draw off the solvent vapor, reducing the pressure in chamber 10. I thus effectuated the evaporation of liquid solvent from pores of the fruit in cages 12—12. While pump 87 had thereby been reducing the absolute pressure of solvent vapor in chamber 10 to about four inches of mercury or lower, which required from five to fifteen minutes of time, depending upon the capacity of the pump, vaporization of liquid solvent from the pores of the fruit had been reducing the temperature at which the fruit had hardened sufficiently to enable its puffed structure to remain distended against the increase of pressure in chamber 10 occasioned by the admission of air or other suitable gas into the chamber to break the final vacuum; such temperature being less than 120° F., preferably about 100° F. On some occasions evaporation of solvent had reduced the fruit below about 76° F. as indicated by thermocouples placed among the slices of fruit, and I took that as an indication that solvent still remained in the pores of the fruit for the reason that actual tests showed this to be true in most instances and I therefore continued to circulate superheated solvent vapor at 120° F. to 100° F. among the fruit slices until their temperature at an absolute pressure of four inches or less of mercury had risen to about 76° F.; thereby I made sure that substantially all solvent had been evaporated from the slices. When the slices of apple were at a temperature lower than 120° F. and higher than 76° F. and the absolute pressure was less than four inches of mercury I admitted air to chamber 10 to break the vacuum and I removed the fruit. The apple slices so treated were found to be white, of porous puffed structure, crisp, substantially anhydrous and possessed of an oil content of about ten to twenty per cent.

*Example 2.*—Commercially dried slices approximately ⅜ inch thick made from Gravenstein apples of Sebastopol, California, and containing about 20% moisture and about 0.1% sulfur dioxide were treated in processing chamber 10 at an initial absolute pressure of approximately six inches of mercury by coconut oil at an initial temperature of about 174° F. Then the pressure was gradually reduced and the temperature was gradually raised until 30 minutes had elapsed and the pressure had become one fourth inch of mercury and the temperature had reached 195° F.; then the temperature and pressure were maintained constant for 10 additional minutes. Then the fruit was cooled to about 100° F. with cool coconut oil and the oil was then drained off the fruit. The apple slices were now well puffed, rigid, substantially anhydrous and possessed of an oil content of about 19%. After one treatment with liquid dichlorodifluoromethane in the manner described in Example 1, a small sample of apple removed from the chamber was found to contain 16% of coconut oil; after two treatments with the solvent the fruit contained 12% of coconut oil; after three treatments with solvent, the fruit contained 9% of coconut oil; after four treatments with solvent, the fruit contained 6% of coconut oil; after five treatments with the solvent, the fruit contained 4% of coconut oil; after six treatments with the solvent, the fruit contained 3% of coconut oil.

*Example 3.*—Fresh whole Thompson Seedless grapes grown in Redding, California, containing 80% moisture were placed in the vacuum chamber and dehydrated at an initial absolute pressure of 1.0 inch of mercury by raisin oil at 160° F.; as the dehydration progressed the pressure was gradually lowered to 0.18 inch of mercury and the temperature of the oil was raised to 195° F. After one hour of treatment the grapes were well puffed and contained only 1.0% moisture. Then the temperature of the incoming oil was reduced to about 78° F., and the puffed grapes were cooled to 100° F. and hardened thereby. A test revealed that the grapes contained 6.4% of oil in this stage. Then the raisin oil was drained and liquid trichloromonofluoromethane at about 90° F. was introduced to cover the puffed grapes. Then the temperature of the trichloromonofluoromethane was increased to 160° F. to heat the grapes, and the absolute pressure in the processing chamber rose to 124 inches of mercury. Then the liquid trichloromonofluoromethane was drained off the grapes and the vapor in chamber 10 was condensed in condenser 91 until the absolute pressure in processing chamber 10 was reduced to about 32 inches. A test made after this stage was completed revealed that the grapes contained 3.7% oil, and their temperature had been reduced well below 100° F. by evaporation of the solvent, and they had become hard again. Then liquid trichloromonofluoromethane at about 90° F. was introduced again into the chamber to cover the grapes, and the temperature of the same solvent was raised to 160° F. to heat the grapes. Then the solvent was drained off the grapes, and by action of pump 94 and heater 92, heated vapor from the same solvent at a temperature of about 100° F. was circulated among the grapes while the pressure in chamber 10 was being reduced by condensation of solvent vapors in condenser 91 until substantially all liquid solvent was evaporated from pores of the grapes.

I claim:

The process for dehydrating solid food objects containing moisture that comprises the steps of: circulating fat at from substantially 150° F. to substantially 250° F. in intimate contact with said objects, then replacing said fat with relatively cool fat of a temperature substantially lower than 150° F., then draining off said relatively cool fat and thereafter circulating a volatile, non-toxic, inert oil solvent of relatively high vapor pressure through said product at a pressure above the vapor pressure of said solvent, then reducing pressure upon said food below the vapor pressure of said solvent and heating said food by passing superheated vapors into contact with said food to evaporate said solvent with said vapor being at a temperature of substantially 140° F. to 180° F.

References Cited in the file of this patent

UNITED STATES PATENTS

| | | |
|---|---|---|
| 1,059,820 | Besemfelder | Apr. 22, 1913 |
| 1,199,124 | Snelling | Sept. 26, 1916 |
| 1,418,638 | Frankel et al. | June 6, 1922 |
| 1,589,504 | Agopian | June 22, 1926 |
| 1,929,691 | Hutteman | Oct. 10, 1933 |
| 1,934,677 | Ash | Nov. 14, 1933 |
| 2,086,072 | Fauth et al. | July 6, 1937 |
| 2,244,680 | Engstrom et al. | June 10, 1941 |
| 2,420,517 | Brandner et al. | May 13, 1947 |
| 2,473,184 | Webb | June 14, 1949 |
| 2,503,312 | Worsham et al. | Apr. 11, 1950 |
| 2,539,544 | Levin et al. | Jan. 30, 1951 |